United States Patent [19]

Williamson

[11] 4,235,109

[45] * Nov. 25, 1980

[54] STEM SEAT FOR PISTON AND CYLINDER TYPE THERMAL DEVICE

[75] Inventor: Warren G. Williamson, Louisville, Tenn.

[73] Assignee: Robertshaw Controls Company, Richmond, Va.

[*] Notice: The portion of the term of this patent subsequent to Dec. 25, 1996, has been disclaimed.

[21] Appl. No.: 58,084

[22] Filed: Jul. 16, 1979

Related U.S. Application Data

[63] Continuation-in-part of Ser. No. 918,069, Jun. 22, 1978, Pat. No. 4,179,928.

[51] Int. Cl.³ .............................................. G01K 5/32

[52] U.S. Cl. ...................................... 73/368.3; 60/520

[58] Field of Search .................. 73/368.3; 60/527, 528

[56] References Cited

U.S. PATENT DOCUMENTS

| | | | |
|---|---|---|---|
| 2,806,375 | 9/1957 | Wood | 73/368.3 |
| 2,915,900 | 12/1959 | Vernet | 60/527 X |
| 3,016,747 | 1/1962 | Vernet | 73/368.3 |
| 3,046,787 | 7/1962 | Wagner | 73/368.3 |
| 3,064,477 | 11/1962 | Vernet | 73/368.3 |
| 3,080,756 | 3/1963 | Baker | 73/368.3 |
| 3,131,563 | 5/1964 | Britton | 60/527 X |
| 3,149,455 | 9/1964 | Daly et al. | 73/368.3 |
| 3,333,471 | 8/1967 | Terp | 73/368.3 |
| 3,357,252 | 12/1967 | Vernet | 73/368.3 |
| 3,719,085 | 3/1963 | Sliger | 73/368.3 |

*Primary Examiner*—Daniel M. Yasich
*Attorney, Agent, or Firm*—Candor, Candor & Tassone

[57] ABSTRACT

A piston and cylinder type thermal device having a resilient stem seat provided with an opening in one end thereof and receiving an actuating stem in the opening that is adapted to reciprocate in the opening in response to the thermal expansion and contraction of a charge of material in the device and operatively acting on the stem seat adjacent the other end thereof. The opening includes one portion thereof adjacent the other end of the stem seat that is substantially smaller in diameter than the diameter of the portion of the stem that is to be received that one portion when the stem seat is in the unassembled condition thereof. The opening further includes another portion thereof adjacent the one end of the stem seat that is substantially smaller in diameter than the diameter of the portion of the stem that is to be received in said other portion when the stem seat is in the unassembled condition thereof. The opening further includes an intermediate portion of the opening that joins with the one portion and the other portion thereof and has a diameter that is substantially the same as the diameter of the portion of the stem that is to be received in the intermediate portion when the stem seat is in the unassembled condition thereof.

24 Claims, 11 Drawing Figures

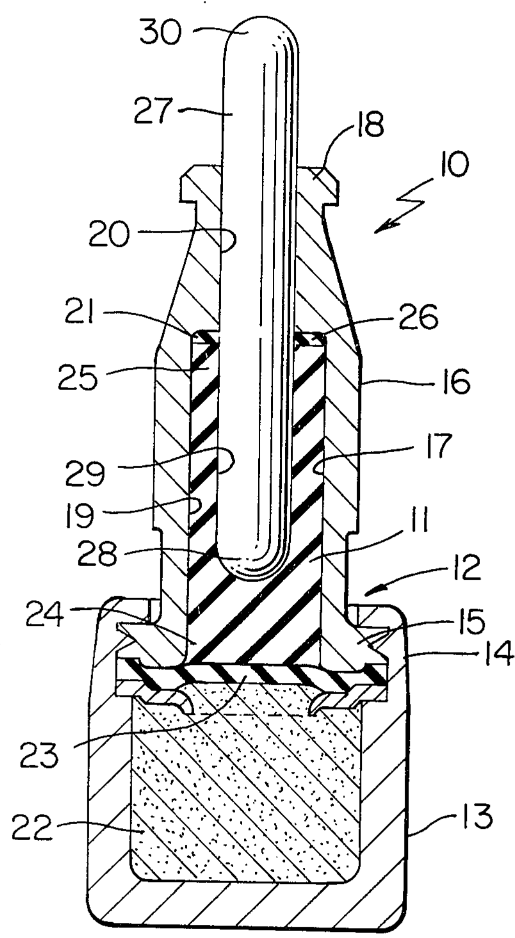
FIG. 1
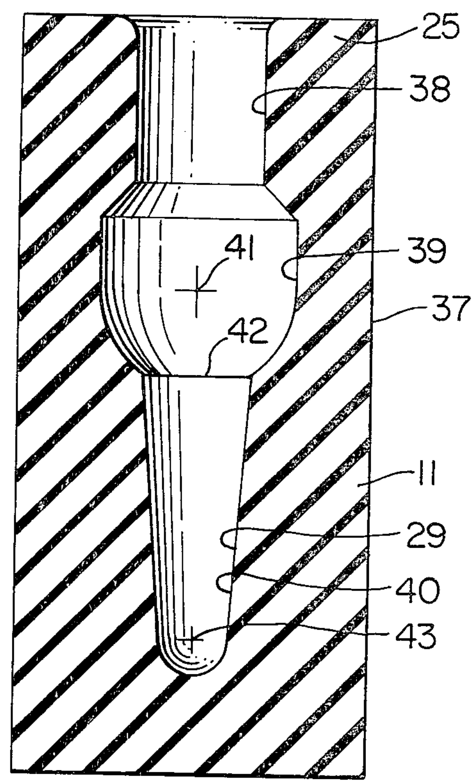
FIG. 2
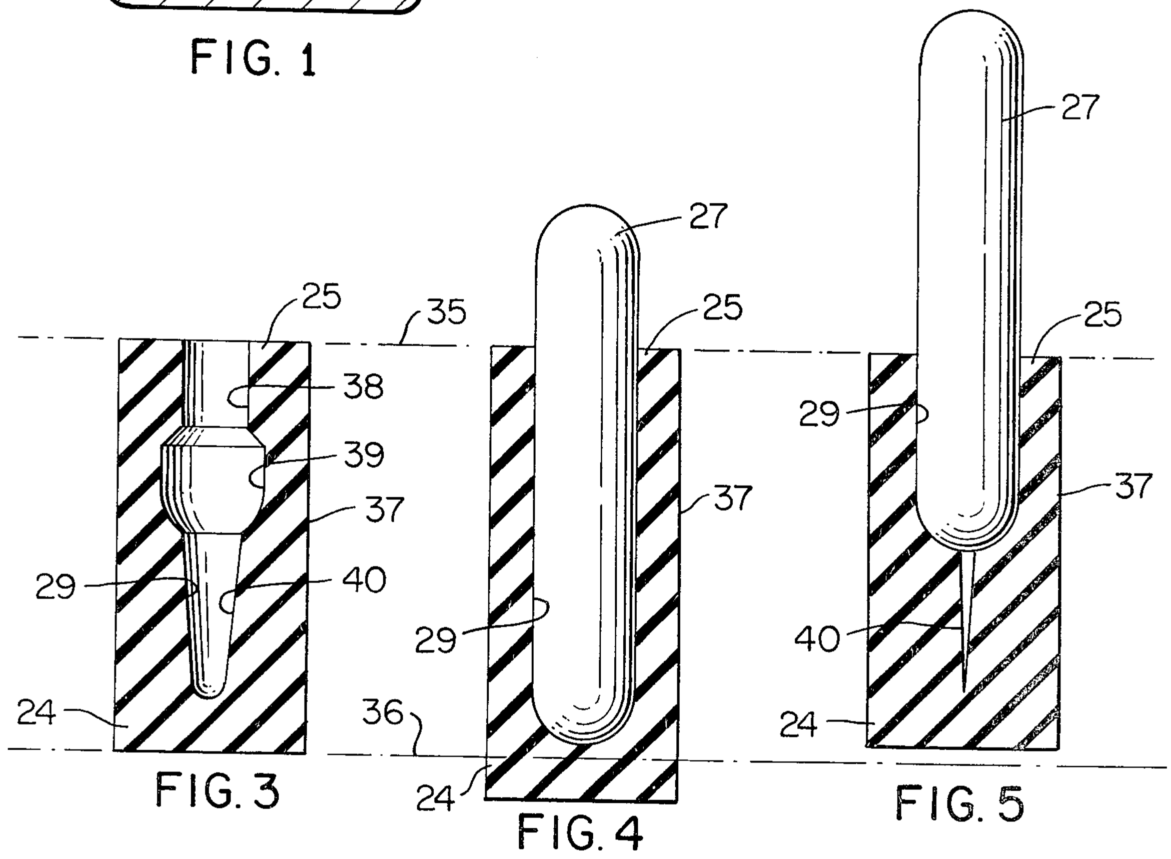
FIG. 3
FIG. 4
FIG. 5

STEM SEAT FOR PISTON AND CYLINDER TYPE THERMAL DEVICE

CROSS-REFERENCE TO RELATED APPLICATION

This application is a continuation-in-part patent application of its parent co-pending patent application, Ser. No. 918,069, filed June 22, 1978, now U.S. Pat. No. 4,179,928.

BACKGROUND OF THE INVENTION

1. Field of the Invention

This invention relates to a piston and cylinder type thermal device and method of making the same as well as to a resilient stem seat for such a device and method of making the same.

2. Prior Art Statement

It is known to provide a substantially pure push type thermal device having a resilient stem seat provided with an opening in one end thereof and receiving an actuating stem in the opening that is adapted to reciprocate in the opening in response to the thermal expansion and contraction of a charge of material in the device and operatively acting on the stem seat adjacent the other end thereof.

For example, see the following U.S. patent:

(1) U.S. Pat. No. 3,046,787—Wagner

It appears that the resilient stem seat of item (1) above has the diameter of the opening therein substantially the same as the diameter of the actuating stem being received therein except that a narrow section of the stem seat adjacent to the open end of the opening has a reduced diameter through which the stem is press-fitted to not only form a seal between the stem and the stem seat, but also between the stem seat and the casing carrying the same.

Another known type of thermal device comprises a squeeze-push type wherein the resilient stem seat has a considerable length thereof radially surrounded by the charge of material which, when expanded, will squeeze the stem seat radially inwardly to squeeze and, thus, push the actuating stem relative to the stem seat.

For example, see the following U.S. Patent:

(2) U.S. Pat. No. 3,016,747—Vernet

It appears that the opening in the resilient stem seat has a diameter less than the outside diameter of the actuating stem so that the actuating stem must be press-fitted in the opening of the stem seat substantially throughout the entire length thereof during the assembly of the stem within the stem seat.

Another known type of thermal device comprises a substantially pure squeeze type wherein the resilient stem seat has substantially the entire length thereof radially surround by the charge of material which, when expanded, will squeeze the stem seat radially inwardly to squeeze and, thus, push the actuating stem relative to the stem seat.

For example, see the following U.S. Patent:

(3) U.S. Pat. No. 3,080,756—Baker

It appears that the resilient stem seat of item (3) above is formed with the stem diameter and the stem seat diameter such that the cross-sectional area of the enclosing wall is equal to or greater than the area of the cavity within the elastic stem seat body so that there are only small stresses upon the walls of the elastic stem seat body during expansion of the charge in the device.

SUMMARY OF THE INVENTION

It was found according to the invention set forth in the aforementioned co-pending parent application that existing resilient stem seat designs for the push type of thermal power elements or devices are prone to rupture as the devices are cycled.

Accordingly, it is a feature of that invention to tend to reduce such rupture of the flexible stem seat for push type thermal devices.

In particular, it was found that prior stem seat designs each tend to rupture and, thus, fail because the same tend to wad as the respective device makes its power stroke, such wadding taking place in the resilient stem seat between the end thereof that is being acted upon by the thermally expanding charge of material of the device and the closed end of the opening that carries the actuating stem.

Accordingly, it is another feature of that invention to tend to prevent wadding of the resilient stem seat of a push type thermal device.

In particular, one embodiment of that invention provides a push type thermal device having a resilient stem seat provided with an opening in one end thereof and receiving an actuating stem in the opening that is adapted to reciprocate in the opening in response to the thermal expansion and contraction of a charge of material in the device and operatively acting on the end of the stem seat, the stem seat having means for substantially preventing wadding of the stem seat during the stroking of the stem by the expansion of the charge of material.

In one embodiment of that invention, such means of the stem seat comprises a configuration thereof that initially has substantially the same length and inside shape between the ends thereof in its unassembled condition as the stem seat has when in the assembled and fully stroked condition thereof.

The opening in the resilient stem seat of that invention included one portion thereof adjacent the other end of the stem seat that is substantially smaller in diameter than the diameter of the portion of the stem that is to be received in that one portion when the stem seat is in the unassembled condition thereof. The opening further includes another portion thereof adjacent the one end of the stem seat that is substantially smaller in diameter than the diameter of the portion of the stem that is to be received in the other portion of the stem seat is in the unassembled condition thereof. The opening further includes an intermediate portion of the opening that joins the one portion and the other portion thereof and has a diameter that is substantially the same as the diameter of the portion of the stem that is to be received in the intermediate portion when the stem seat is in the unassembled condition thereof.

While the invention of the aforementioned copending parent patent application was intended for the push type thermal device, it was subsequently found by applicant that such unique opening configuration in the resilient stem seat could be applied to stem seats for other type of thermal devices, such as the pure squeeze type thermal device as well as to the combination squeeze-push type of thermal device.

Therefore, it is a feature of this continuation-in-part application to illustrate, describe and claim the unique opening in the resilient stem seat that will permit such stem seat to tend to be substantially rupture free and can be utilized in various types of piston and cylinder thermal devices by merely making slight modification therein as will be apparent hereinafter.

In particular, one embodiment of this invention provides a piston and cylinder type thermal device having a resilient stem seat provided with an opening in one end thereof and receiving an actuating stem in the opening that is adapted to reciprocate in the opening in response to the thermal expansion and contraction of a charge of material in the device and operatively acting on the stem seat adjacent the other end thereof. The opening of the stem seat includes one portion thereof adjacent the other end of the stem seat that is substantially smaller in diameter than the diameter of the portion of the stem that is to be received in that one portion when the stem seat is in the unassembled condition thereof. The opening further includes another portion thereof adjacent to the one end of the stem seat that is substantially smaller in diameter than the diameter of the portion of the stem that is to be received in the other portion when the stem seat is in the unassembled condition thereof. The opening further includes an intermediate portion of the opening that joins with the one portion and the other portion thereof and has a diameter that is substantially the same as the diameter of the portion of the stem that is to be received in the intermediate portion when the stem seat is in the unassembled condition thereof.

Accordingly, it is an object of this invention to provide an improved piston and cylinder type thermal device having one or more of the novel features of this invention as set forth above or hereinafter shown or described.

Another object of this invention is to provide a method of making such a piston and cylinder type thermal device, the method of the invention having one or more of the novel features of this invention as set forth above or hereinafter shown or described.

Another object of this invention is to provide a resilient stem seat for a piston and cylinder type thermal device, the stem seat of this invention having one or more of the novel features of this invention as set forth above or hereinafter shown or described.

Another object of this invention is to provide a method of making such a resilient stem seat, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a cross-sectional view of one of the improved piston and cylinder type thermal devices of this invention.

FIG. 2 is an enlarged cross-sectional view illustrating the improved flexible stem seat of this invention for the device of FIG. 1.

FIG. 3 is a reduced view of the improved stem seat of this invention for the device of FIG. 1 and in the unassembled condition thereof.

FIG. 4 is a view similar to FIG. 3 and illustrates the stem seat of this invention for the device of FIG. 1 and in its assembled condition with its actuating stem.

FIG. 5 is a view similar to FIG. 4 and illustrates the assembled stem and stem seat of this invention for the device of FIG. 1 and in their stroked condition.

DESCRIPTION OF THE PREFERRED EMBODIMENTS

Figure 6:
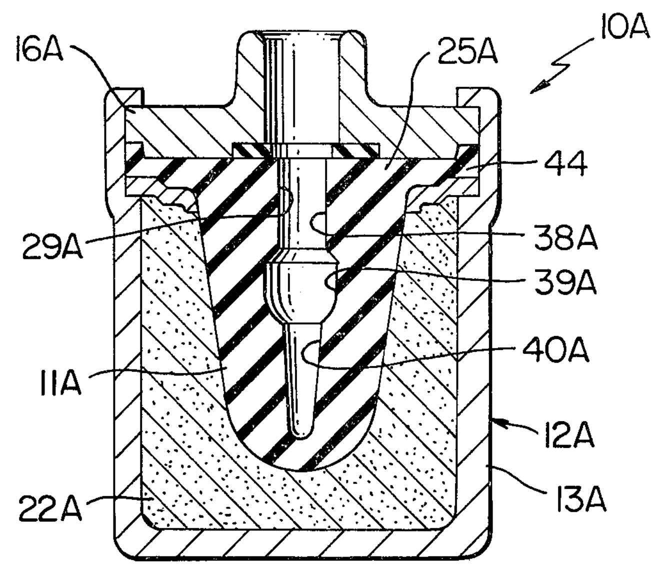
FIG. 6 is a view similar to FIG. 1 and illustrates another of the improved piston and cylinder type thermal devices of this invention, FIG. 6 illustrating the device without the actuating stem assembled thereto.

While the various features of this invention are hereinafter described and illustrated as being particularly adapted to provide a resilient stem seat for a piston and cylinder thermal device, it is to be understood that the various features of this invention can be utilized singly or in any combination thereof to provide a resilient stem seat for other types of devices, as desired.

Therefore, this invention is not to be limited to only the embodiments illustrated in the drawings, because the drawings are merely utilized to illustrate one of the wide variety of uses of this invention.

Referring now to FIG. 1, the improved substantially pure push type of piston and cylinder thermal device of this invention is generally indicated by the reference numeral 10 and is basically the same as the thermal device disclosed in the U.S. Pat. No. 3,719,085 to Sliger, and the aforementioned U.S. Pat. No. 3,046,787 to Wagner, except for the resilient stem seat 11 thereof which has the unique unassembled configuration illustrated in FIG. 2 for a purpose hereinafter described.

Thus, since structure and operation of the thermal device 10 is well known in the art, it is only necessary to describe the parts of the thermal device 10 in a general manner in order to fully understand the features of this invention whereby the aforementioned U.S. Patent to Sliger and U.S. Patent to Wagner are incorporated into this disclosure by reference for the details of the structure and apparatus of a push type thermal device.

As illustrated in FIG. 1, the thermal device 10 includes a housing means that is generally indicated by the reference numeral 12 and comprises a cup-shaped metallic member 13 secured at its open end 14 to an end 15 of another metallic housing member 16 that has a stepped bore 17 passing completely through the opposed ends 15 and 18, the lower portion 19 of the stepped bore 17 being substantially cylindrical and being larger in diameter than the upper portion 20 of the stepped bore 17 so as to be joined thereto by an annular shoulder 21 of the housing member 16.

A conventional charge of thermally expandable and contractible material 22 is disposed in the cup 13 which carries a disc-like resilient diaphragm member 23 separating the charge of material 22 from the resilient stem seat 11 that substantially fills the portion 19 of the bore 17 as illustrated, the stem seat 11 having its lower end 24 disposed against the disc-like diaphragm 23 while its upper end 25 is disposed against a seal member 26 held against the annular shoulder 21 of the housing member 16 as illustrated.

A metallic actuating stem 27 has its lower substantially hemispherical end 28 received in an opening 29 formed in the stem seat 11 and interrupting the upper end 25 thereof while terminating short of the lower end 24 thereof whereby the upper substantially hemispherical end 30 of the actuating stem 27 projects out of the upper portion 20 of the bore 17 to operate any desired structure, such as a valve means, etc., in a manner well known in the art.

When the charge of material 22 is heated to a certain temperature, depending upon the particular rating of the charge of material 22 being utilized in the device 10, the charge of material 22 expands and, thus, forces the diaphragm 23 upwardly in FIG. 1 and thereby pushes on the end 24 of the stem seat 11 to cause the same to force the actuating stem 27 upwardly. Conversely, upon a subsequent cooling of the charge of material 22, the charge of material 22 contracts so that a force being imposed upon the upper end 30 of the stem 27 will cause the stem 27 to be retracted back into the housing means 12 in a manner well known in the art.

Thus, when the stem 27 is in its fully retracted condition into the housing means 12, the device 10 is in its unstroked condition and when the stem 27 has been pushed out of the housing 12 to its fully extended condition, the device 10 is in its stroked condition as is well known in the art.

As previously stated, it is a feature of the invention set forth in the aforementioned co-pending parent patent application to prevent a wadded and/or wrinkled condition of the resilient stem seat of a push type thermal element in its stroked condition to thereby tend to prevent subsequent rupture of such stem seat through the cycling thereof between the stroked and unstroked conditions thereof.

This feature is accomplished by making or molding the resilient stem seat 11 of this invention with a length and inside shape as provided by the opening 29 thereof, which will be substantially the same as an installed stem seat 11 which is in the stroked condition whereas, in contrast, the prior art stem seat of aforementioned U.S. Pat. No. 3,046,787, to Wagner, is made or molded with a length and inside shape which are roughly the same as the shape of an installed stem seat in the unstroked condition thereof.

In general, the improved resilient stem seat 11 of this invention, while being formed of the same rubber or other suitable material as such prior art stem seat and having substantially the same outside diameter as such prior art stem seat, has a reduced length therefrom, and as illustrated in FIG. 3, the length of the stem seat 11 of this invention in its unassembled condition has its upper end 25 disposed at the horizontally disposed dashed line 35 while its lower end 24 is disposed at the horizontally disposed dashed line 36.

The lines 35 and 36 extend through FIGS. 4 and 5, FIG. 4 illustrating the stem seat 11 of this invention in its unstroked and assembled condition with the actuating stem 27, while FIG. 5 illustrates the assembled stem seat 11 in its fully stroked condition whereby it can be seen that no wadding or wrinkling of the lower end 24 thereof takes place and the outer peripheral and cylindrical surface 37 of the stem seat 11 remains smooth and continuous throughout its entire length. Also, the overall length of the stem seat 11 in its assembled and fully stroked condition is substantially the same as the unassembled stem seat illustrated in FIG. 3.

As previously stated, it is believed that the reason for the stem seat 11 being substantially the same in overall length in its unassembled condition and in its fully stroked and assembled condition is because of the configuration of opening 29 thereof which is uniquely formed and is best illustrated in FIG. 2.

In particular, it can be seen that the opening 29 has three portions or sections 38, 39 and 40 with the section 38 being substantially for the same purpose and formed in the same manner as a similar section of the stem seat of aforementioned U.S. Pat. No. 3,046,787 to Wagner, while the section 40 is substantially reduced in diameter and conical and the intermediate section 39 is substantially cup-shaped and with a larger diameter than the diameter of either outboard section 38 and 40 as will be apparent hereinafter.

Because the portion 40 of the opening 29 of the resilient stem seat 11 of this invention is substantially smaller in diameter than the diameter of the actuating stem 27 and is of the configuration illustrated in FIG. 2, the portion 40 of the opening 29 closes in a smooth manner as illustrated in FIG. 5 during the stroking of the assembled seat 11 and permits the overall length of the seat 11 in its assembled and stroked condition to be only slightly shorter than the length of the stem seat 11 in the unassembled condition as illustrated in FIG. 3.

In contrast, when the stem 27 is assembled to the stem seat 11 in its unstroked condition as illustrated in FIG. 4, it can be seen that the same stretches the length of the stem seat 11 considerably below the line 36 to fill the portion 19 of the stepped bore 17 of the housing member 16 whereby the stem seat 11 in its assembled and unstroked condition is subjected to axial and hoop tensile stresses which will relax as the device 10 makes its power stroke.

However, in the prior art device of the U.S. Pat. No. 3,046,787, to Wagner, the stem seat is subjected to destructive wadding and compressive stresses as the device makes its power stroke.

While a specific example of a workable stem seat 11 of this invention is hereinafter set forth, it is to be understood that this is not for the purpose of limitation of this invention as such dimensions are merely given as an example to compare with a prior art stem seat of the U.S. Pat. No. 3,046,787, to Wagner, which is subjected to the aforementioned wadding and compressive stresses during the assembled and stroked condition thereof.

In particular, for a typical device 10 wherein the housing member 16 has the portion 19 of the stepped bore 17 thereof formed with a diameter of approximately 0.230 of an inch and a length between the shoulder 21 and the outer end 15 of approximately 0.599 of an inch and a metallic stem 27 approximately 0.974 of an inch long and approximately 0.1258 of an inch in diameter, the resilient prior art stem seat in its unassembled condition has an outside diameter of approximately 0.231 of an inch and an overall length of approximately 0.532 of an inch while the opening had an overall length of approximately 0.470 of an inch with the larger diameter thereof being approximately 0.126 of an inch and the smaller diameter thereof being approximately 0.085 of an inch and approximately 0.125 of an inch in length.

In contrast, the resilient stem seat 11 of this invention for such a casing 16 has an outside diameter of approximately 0.231 of an inch and an overall length of approximately 0.484 of an inch. The opening 29 has an overall length of approximately 0.422 of an inch while the portion 38 has a diameter of approximately 0.087 of an inch and the intermediate portion 39 has a diameter of approximately 0.126 of an inch and the section thereof that joins with the portion 40 is defined on a spherical radius of approximately 0.063 of an inch and the part thereof which joins with the portion 38 is formed on an angle of approximately 45° with the longitudinal axis of the stem seat 11.

The portion 40 of the opening 29 is substantially conical with the larger end thereof that joins with the portion 39 having a diameter of approximately 0.067 of an inch while the smaller portion adjacent the end 24 has a diameter of approximately 0.045 of an inch, the apex of the conical portion 40 being defined with a spherical radius of approximately 0.022 of an inch.

In the above example of the resilient stem seat 11 of this invention, the length of the portion 38 of the opening 29 from the end 25 to the end of the angle that defines the larger diameter of the intermediate portion 39 is approximately 0.125 of an inch and the length from the end 25 to a point 41 that defines the spherical radius for the intermediate portion 39 is approximately 0.175 of an inch. The length from the end 25 to the point 42 where the portion 40 of the opening 29 begins is approximately 0.228 of an inch whereas the length from the end 25 to the point 43 where the spherical radius for the apex for the conical portion 40 begins is approximately 0.400 of an inch whereby it can be seen that the overall length of the portion 40 of the opening 29 is substantially the same as the combined lengths of the other portions 38 and 39 of the opening 29.

From the above, it can be seen that this invention provides an improved substantially pure push type thermal device which will not have its resilient stem seat wad or wrinkle during the stroked condition thereof and the stem seat will remain substantially smooth and continuous in its outer surface in its stroked condition as illustrated in FIG. 5 whereby the cycling of the stem seat 11 of this invention between its stroked condition of FIG. 5 and its unstroked condition of FIG. 4 in the manner previously described will not cause the stem seat 11 to rupture and, thereby, wear out in the same manner if the same tended to wad in the manner of the prior known stem seat of aforementioned U.S. Pat. No. 3,046,787 to Wagner.

As previously stated, it was found according to the teachings of this continuation-in-part patent application that the particular configuration of the opening 29 of the resilient stem seat 11, while originally invented to prevent wadding or wrinkling during the stroked condition of a substantially pure push type piston and cylinder thermal device 10, could be utilized in the resilient stem seats of other types of piston and cylinder type thermal devices, such as pure squeeze and combination squeeze-push types, to also prevent wadding and/or wrinkling thereof during the stroked condition of such devices.

Figure 8:
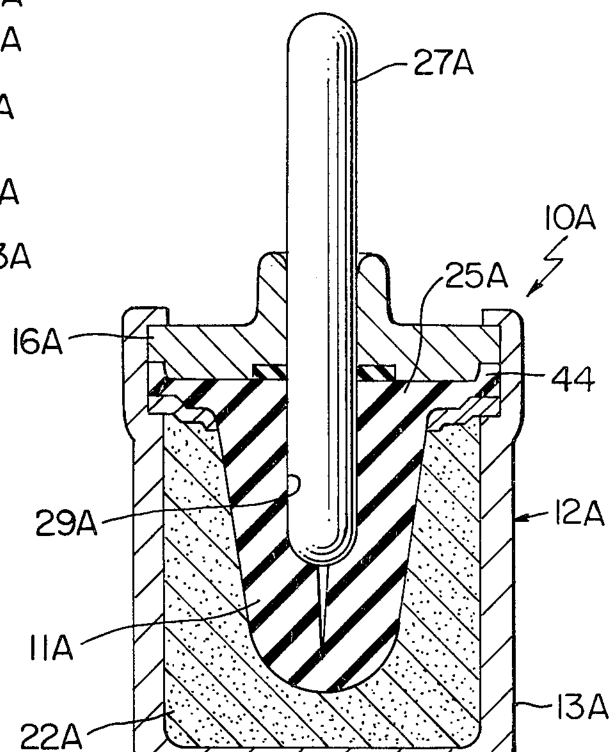
FIG. 8 is a view similar to FIG. 7 and illustrates the device of FIG. 6 in its stroked condition.
Figure 7:
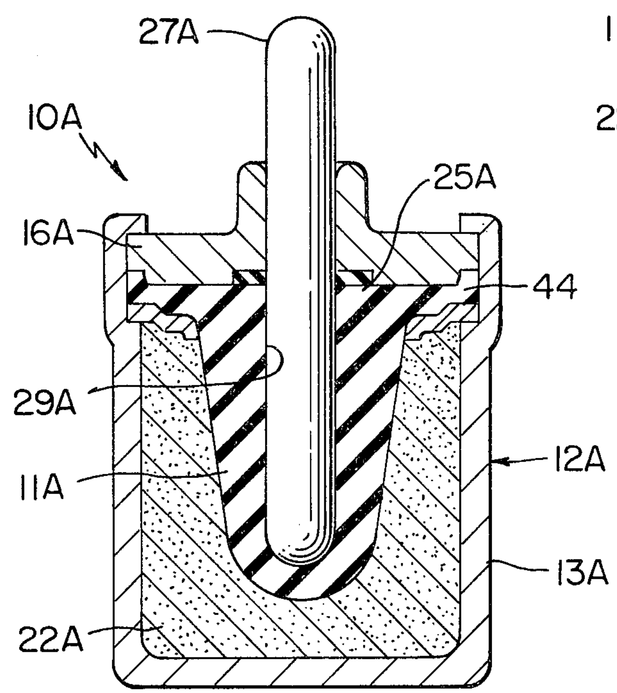
FIG. 7 is a view similar to FIG. 6 and illustrates the device of FIG. 6 after the actuating stem has been assembled thereto.

For example, reference is now made to FIGS. 6–8 wherein another piston and cylinder type thermal device of this invention is generally indicated by the reference numeral 10A and parts thereof similar to the device 10 previously described are indicated by like reference numerals followed by the reference letter "A".

As illustrated in FIGS. 6–8, the piston and cylinder device 10A is substantially of a pure squeeze type and comprises the housing means 12A containing the charge

22A and the modified resilient stem seat 11A of this invention, the stem seat 11A having an outward directed peripheral mounting flange 44 at the upper end 25A thereof which is held between the housing parts 13A and 16A as illustrated.

The resilient stem seat 11A has the opening 29A formed therein of the three portions 38A, 39A and 40A in substantially the same manner previously described to accommodate the actuating stem 27A as illustrated in FIG. 7 so that when the device 10A is in the stroked condition as illustrated in FIG. 8, it can be seen that the resilient stem seat 11A does not wad or wrinkle and provides a smooth external configuration that substantially resembles the original and unassembled substantial conical configuration illustrated in FIG. 6.

Figure 9:
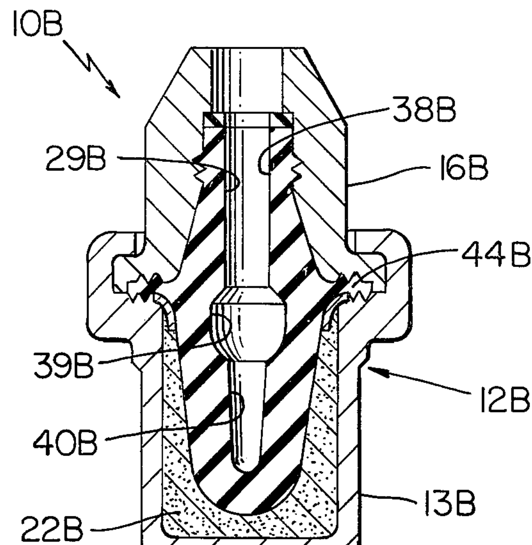
FIG. 9 is a view similar to FIG. 6 and illustrates another of the improved piston and cylinder type thermal devices of this invention, FIG. 9 illustrating the device without the actuating stem being assembled thereto.
Figure 11:
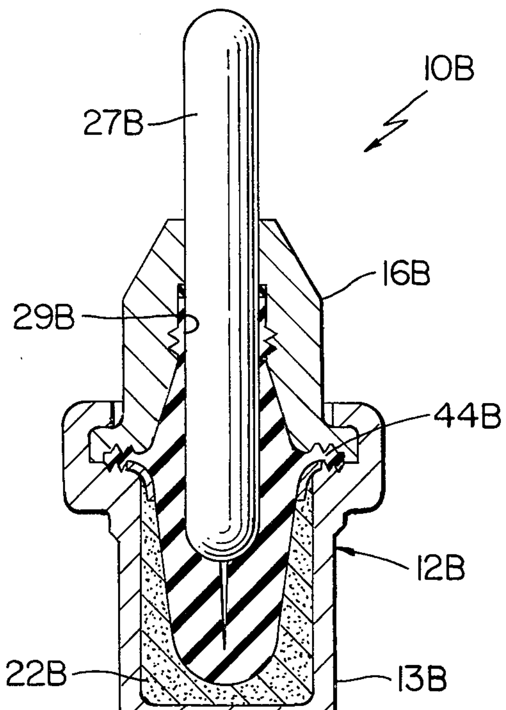
FIG. 11 is a view similar to FIG. 10 and illustrates the device of FIG. 9 in its stroked condition.
Figure 10:
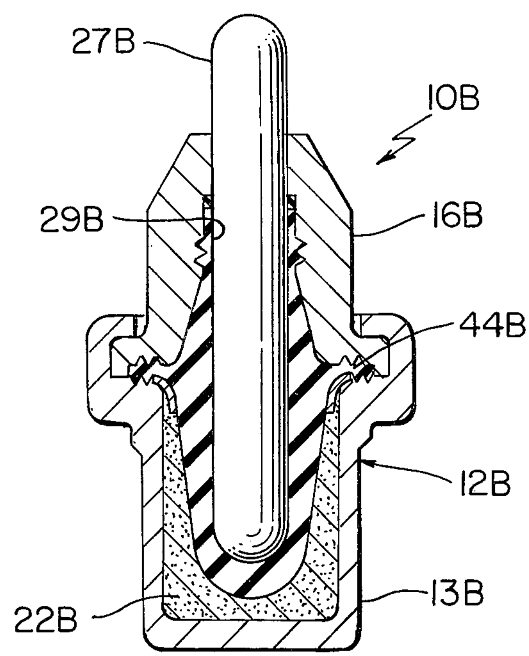
FIG. 10 is a view similar to FIG. 9 and illustrates the device of FIG. 9 after the actuating stem has been assembled thereto.

Similarly, another piston and cylinder type thermal device of this invention is generally indicated by the reference numeral 10B in FIGS. 9–11 and parts thereof similar to the devices 10 and 10A previously described are indicated by like reference numerals followed by the reference letter "B".

As illustrated in FIG. 9, the device 10B includes the housing means 12B formed of housing parts 13B and 16B secured together and capturing therebetween an outwardly directed peripheral mounting flange 44B of the resilient stem seat the flange 44B being disposed substantially adjacent the intermediate portion 39B of the opening 29B as the device 10B is a combination squeeze-push type of thermal device wherein the charge 22B merely surrounds the lower, substantially smooth conical portion of the stem seat 11B adjacent the portions 39B and 40B of the opening 29B while the upper portion 38B of the opening 29B is above the charge 22B.

Nevertheless, it can be seen that opening 29B is substantially the same as the openings 29A and 29 previously described so that the same is adapted to accept the stem 27B in the manner illustrated in FIG. 10 to permit the stem seat 11B to have the smooth and unwadded configuration when the device 10B is stroked in the manner illustrated in FIG. 11.

Therefore, it can be seen that the opening of a resilient stem seat for substantially any type of piston and cylinder thermal device can be formed with the three portions 38, 39 and 40 previously described so that such seat will not substantially wad, wrinkle and rupture for the reasons previously set forth.

Therefore, it can be seen that this invention not only provides an improved piston and cylinder type thermal device and method of making the same, but also this invention provides an improved resilient stem seat and method of making the same.

While the forms and methods of this invention now preferred have been described and illustrated as required by the Patent Statute, it is to be understood that other forms and method steps can be utilized and still fall within the scope of the appended claims.

What is claimed is:

1. In a piston and cylinder type thermal device having a resilient stem seat provided with an opening in one end thereof and receiving an actuating stem in said opening that is adapted to reciprocate in said opening in response to the thermal expansion and contraction of a charge of material in said device and operatively acting on said stem seat adjacent the other end thereof, said opening having three portions thereof disposed in serially aligned and interconnected relation, said stem having three portions thereof respectively disposed in said three portions of said opening, said portions of said opening and said stem each having a main diameter, said main diameters of said portions of said stem being substantially the same size, the improvement wherein said opening of said stem seat has one of said portions thereof disposed adjacent said other end of said stem seat and having its said diameter substantially smaller than said diameter of the portion of said stem that is to be received in said one portion when said stem seat is in the unassembled condition thereof, said opening having another of said portions thereof disposed adjacent said one end of said stem seat and having its said diameter substantially smaller than said diameter of the portion of said stem that is to be received in said other portion when said stem seat is in the unassembled condition thereof, the remaining portion of said opening comprising an intermediate portion of said opening that joins with said one portion and said other portion and has its said diameter substantially the same size as said diameter of the portion of said stem that is to be received in said intermediate portion when said stem seat is in the unassembled condition thereof.

2. A thermal device as set forth in claim 1 wherein said one portion of said opening is substantially conical in configuration and has an apex thereof disposed adjacent said other end of said stem seat when said stem seat is in the unassembled condition thereof.

3. A thermal device as set forth in claim 2 wherein said apex is substantially hemispherical in configuration when said stem seat is in the unassembled condition thereof.

4. A thermal device as set forth in claim 2 wherein said other portion of said opening is substantially cylindrical in configuration when said stem seat is in the unassembled condition thereof.

5. A thermal device as set forth in claim 4 wherein said intermediate portion of said opening is substantially cup-shaped in configuration and has a larger end thereof joining said other portion and a smaller end thereof joining said one portion when said stem seat is in the unassembled condition thereof.

6. A thermal device as set forth in claim 5 wherein said stem seat is substantially cylindrical in configuration and has an outside diameter of approximately 0.231 of an inch and an overall length of approximately 0.484 of an inch when said stem seat is in the unassembled condition thereof, said opening having an overall length of approximately 0.422 of an inch with the length of said one portion thereof being approximately 0.194 of an inch and the length of said other portion thereof being approximately 0.125 of an inch while the length of said intermediate portion is approximately 0.103 of an inch when said stem seat is in the unassembled condition thereof.

7. A thermal device as set forth in claim 6 wherein said diameter of said other portion of said opening is approximately 0.087 of an inch and said diameter of said intermediate portion of said opening is approximately 0.126 of an inch while said diameter of said one portion is approximately 0.067 of an inch at the larger end thereof and approximately 0.045 of an inch at the smaller end thereof when said stem seat is in the unassembled condition thereof.

8. A thermal device as set forth in claim 1 wherein said device is a substantially pure push type.

9. A thermal device as set forth in claim 1 wherein said device is a substantially pure squeeze type.

10. A thermal device as set forth in claim 1 wherein said device is a squeeze-push type.

11. A thermal device as set forth in claim 1 wherein said stem seat has an outwardly directed mounting flange adjacent said one end thereof.

12. A thermal device as set forth in claim 1 wherein said stem seat has an outwardly directed mounting flange adjacent said intermediate portion of said opening thereof.

13. In a resilient stem seat for a piston and cylinder type thermal device and being provided with an opening in one end thereof for receiving an actuating stem that is adapted to be reciprocated in said opening in response to the thermal expansion and contraction of a charge of material in said device and adapted to be operatively acting on said stem seat adjacent the other end thereof, said opening having three portions thereof disposed in serially aligned and interconnected relation and adapted to respectively receive three portions of said stem when disposed therein, said portions of said opening and said stem each having a main diameter, said main diameters of said portions of said stem being substantially the same size, the improvement wherein said opening of said stem seat has one of said portions thereof disposed adjacent said other end of said stem seat and having its said diameter substantially smaller than said diameter of the portion of said stem that is to be received in said one portion when said stem seat is in the unassembled condition thereof, said opening having another of said portions thereof disposed adjacent said one end of said stem seat and having its said diameter substantially smaller than said diameter of the portion of said stem that is to be received in said other portion when said stem seat is in the unassembled condition thereof, the remaining portion of said opening comprising an intermediate portion of said opening that joins with said one portion and said other portion and has its said diameter substantially the same size as said diameter of the portion of said stem that is to be received in said intermediate portion when said stem seat is in the unassembled condition thereof.

14. A stem seat for a piston and cylinder type thermal device as set forth in claim 13 wherein said one portion of said opening is substantially conical in configuration and has an apex thereof disposed adjacent said other end of said stem seat when said stem seat is in the unassembled condition thereof.

15. A stem seat for a piston and cylinder type thermal device as set forth in claim 14 wherein said apex is substantially hemispherical in configuration when said stem seat is in the unassembled condition thereof.

16. A stem seat for a piston and cylinder type thermal device as set forth in claim 14 wherein said other portion of said opening is substantially cylindrical in configuration when said stem seat is in the unassembled condition thereof.

17. A stem seat for a piston and cylinder type thermal device as set forth in claim 16 wherein said intermediate portion of said opening is substantially cup-shaped in configuration and has a larger end thereof joining said other portion and a smaller end thereof joining said one portion when said stem seat is in the unassembled condition thereof.

18. A stem seat for a piston and cylinder type thermal device as set forth in claim 17 wherein said stem seat is substantially cylindrical in configuration and has an outside diameter of approximately 0.231 of an inch and an overall length of approximately 0.484 of an inch when said stem seat is in the unassembled condition thereof, said opening having an overall length of approximately 0.422 of an inch with the length of said one portion thereof being approximately 0.194 of an inch and the length of said other portion thereof being approximately 0.125 of an inch while the length of said intermediate portion is approximately 0.103 of an inch when said stem seat is in the unassembled condition thereof.

19. A stem seat for a piston and cylinder type thermal device as set forth in claim 18 wherein said diameter of said other portion of said opening is approximately 0.087 of an inch and said diameter of said intermediate portion of said opening is approximately 0.126 of an inch while said diameter of said one portion is approximately 0.067 of an inch at the larger end thereof and approximately 0.045 of an inch at the smaller end thereof when said stem seat is in the unassembled condition thereof.

20. A stem seat for a piston and cylinder type thermal device as set forth in claim 13 wherein said stem seat is a substantially pure push type.

21. A stem seat for a piston and cylinder type thermal device as set forth in claim 13 wherein said stem seat is a substantially pure squeeze type.

22. A stem seat for a piston and cylinder type thermal device as set forth in claim 13 wherein said stem seat is a squeeze-push type.

23. A stem seat for a piston and cylinder type thermal device as set forth in claim 13 wherein said stem seat has an outwardly directed mounting flange adjacent said one end thereof.

24. A stem seat for a piston and cylinder type thermal device as set forth in claim 13 wherein said stem seat has an outwardly directed mounting flange adjacent said intermediate portion of said opening thereof.

* * * * *